United States Patent
Ramsauer et al.

(10) Patent No.: US 11,270,091 B2
(45) Date of Patent: Mar. 8, 2022

(54) IMAGING SYSTEM

(71) Applicant: VITRONIC Dr.-Ing. Stein Bildverarbeitungssysteme GmbH, Wiesbaden (DE)

(72) Inventors: Jörg Ramsauer, Ingelheim (DE); Robert Smolorz, Niedernhausen (DE); Burghard Hoffmann, Taunusstein (DE)

(73) Assignee: VITRONIC Dr.-Ing. Stein Bildverarbeitungssysteme GmbH, Wiesbaden (DE)

( * ) Notice: Subject to any disclaimer, the term of this patent is extended or adjusted under 35 U.S.C. 154(b) by 97 days.

(21) Appl. No.: 16/815,555

(22) Filed: Mar. 11, 2020

(65) Prior Publication Data
US 2021/0286962 A1    Sep. 16, 2021

(51) Int. Cl.
| | | |
|---|---|---|
| G06K 7/14 | (2006.01) | |
| G02B 5/20 | (2006.01) | |
| G02B 27/28 | (2006.01) | |
| G03B 15/02 | (2021.01) | |
| G06K 7/10 | (2006.01) | |

(52) U.S. Cl.
CPC ............. *G06K 7/1413* (2013.01); *G02B 5/20* (2013.01); *G02B 27/288* (2013.01); *G03B 15/02* (2013.01); *G06K 7/10732* (2013.01); *G06K 7/10831* (2013.01)

(58) Field of Classification Search
CPC ............. G06K 7/1413; G06K 7/10831; G06K 7/10732; G02B 5/20; G02B 27/288; G03B 15/02
USPC ............................................. 235/462.42, 454
See application file for complete search history.

(56) References Cited

U.S. PATENT DOCUMENTS

| | | | | |
|---|---|---|---|---|
| 6,560,253 B1 * | 5/2003 | Munks | ..................... | G02B 5/20 372/20 |
| 2008/0297780 A1 | 12/2008 | Clasen | | |
| 2016/0010979 A1 | 1/2016 | Wehrle et al. | | |

FOREIGN PATENT DOCUMENTS

WO    2018224107    12/2018

OTHER PUBLICATIONS

European Extended Search Report from Application No. 21161989.5, dated Aug. 17, 2021.

* cited by examiner

*Primary Examiner* — Jamara A Franklin
(74) *Attorney, Agent, or Firm* — Burris Law, PLLC

(57) ABSTRACT

An imaging system for capturing an object includes a plurality of light sources for illuminating the object and a plurality of optical sensors. The plurality of light sources emit light radiation and the plurality of optical sensors are arranged to detect light radiation reflected from the object.

20 Claims, 2 Drawing Sheets

IMAGING SYSTEM

FIELD

The present disclosure relates to an imaging system for capturing an object by means of optical sensors.

BACKGROUND

The statements in this section merely provide background information related to the present disclosure and may not constitute prior art.

An imaging system for capturing an object has light sources to illuminate the object and optical sensors, for example to acquire images of objects transported on a conveyor system or to detect a code on an object. In logistics, imaging systems are used, for example, for transport, handling and storage processes in which objects are moved with conveyors.

SUMMARY

This section provides a general summary of the disclosure and is not a comprehensive disclosure of its full scope or all of its features.

In at least one form, the present disclosure refers to an imaging system for capturing an object, comprising a plurality of light sources for illuminating the object and a plurality of optical sensors, wherein the plurality of light sources emit light radiation, and wherein the plurality of optical sensors are adapted to detect light radiation reflected from the object. A first light source and a second light source of the plurality of light sources emit light radiation with an identical wave characteristic. The imaging system further comprises a first filter adapted to influence the wave characteristic, the first filter being arranged such that the light radiation between the first light source and the object falls on the first filter and the reflected light radiation between the object and a first sensor of the plurality of sensors falls on the first filter. Furthermore, the imaging system comprises a second filter which is adapted to influence the wave characteristic, the second filter being arranged such that the light radiation between the second light source and the object falls on the second filter and the reflected light radiation between the object and a second sensor of the plurality of sensors falls on the second filter, the first filter influencing the wave characteristic differently than the second filter.

In at least one form of the imaging system, a third light source of the plurality of light sources is provided, which emits the light radiation with the identical wave characteristic as the first light source and the second light source, wherein a third filter is provided, which is adapted to influence the wave characteristic, the third filter being arranged such that the light radiation between the third light source and the object falls on the third filter and in that the reflected light radiation between the object and a third sensor of the plurality of sensors falls on the third filter and wherein the third filter influences the wave characteristic differently than the first filter and the second filter.

In at least one form of the imaging system, the identical wave characteristic of the light radiation is an identical light source band range of light wavelengths, wherein the plurality of light sources emit the light radiation with the identical light source band range of light wavelengths. The plurality of sensors are adapted to detect the reflected light radiation over the light source band range of light wavelengths, wherein the first filter influences the wave characteristic such that the light source band range is limited to a first subband range of the light wavelengths, and wherein the second filter influences the wave characteristic such that the light source band range is limited to a second subband range of the light wavelengths. For example, the first subband range of light wavelengths is different from the second subband range of light wavelengths, so that an overexposure due to superposition of light waves with intersecting light paths is avoided. The light source band range of light wavelengths may be divided into the first subband range and the second subband range, for example, to provide large subband ranges, possibly to provide subband ranges of approximately equal size.

In at least one form of the imaging system, the third filter influences the wave characteristic such that the light source band range is limited to a third subband range of light wavelengths, the third subband range of light wavelengths being different from the first subband range of light wavelengths and from the second subband range of light wavelengths. The light source band range of light wavelengths may be divided into the first subband range, the second subband range and the third subband range, for example to provide large subband ranges, possibly to provide subband ranges of approximately equal size.

In at least one form of the imaging system, a plurality of mirrors are provided, which allow the light radiation to be reflected and thus an existing installation space can be used.

In at least one form of the imaging system, a first mirror of the plurality of mirrors comprises the first filter and a second mirror of the plurality of mirrors comprises the second filter.

In at least one form of the imaging system, a third mirror of the plurality of mirrors comprises the third filter.

In at least one form of the imaging system, the first filter and the second filter are each provided as a filter disk.

In at least one form of the imaging system, the identical wave characteristic is an irregularly oriented transverse oscillation, wherein the first light source and the second light source emit the light radiation with the irregularly oriented transverse oscillation, and wherein the first sensor and the second sensor are adapted to detect the reflected light radiation with an arbitrarily oriented transverse oscillation. The first filter influences the wave characteristic such that the transverse oscillation is limited to a first oscillation direction and the second filter influences the wave characteristic such that the transverse oscillation is limited to a second oscillation direction, wherein the first oscillation direction of the transverse oscillation is different from the second oscillation direction of the transverse oscillation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
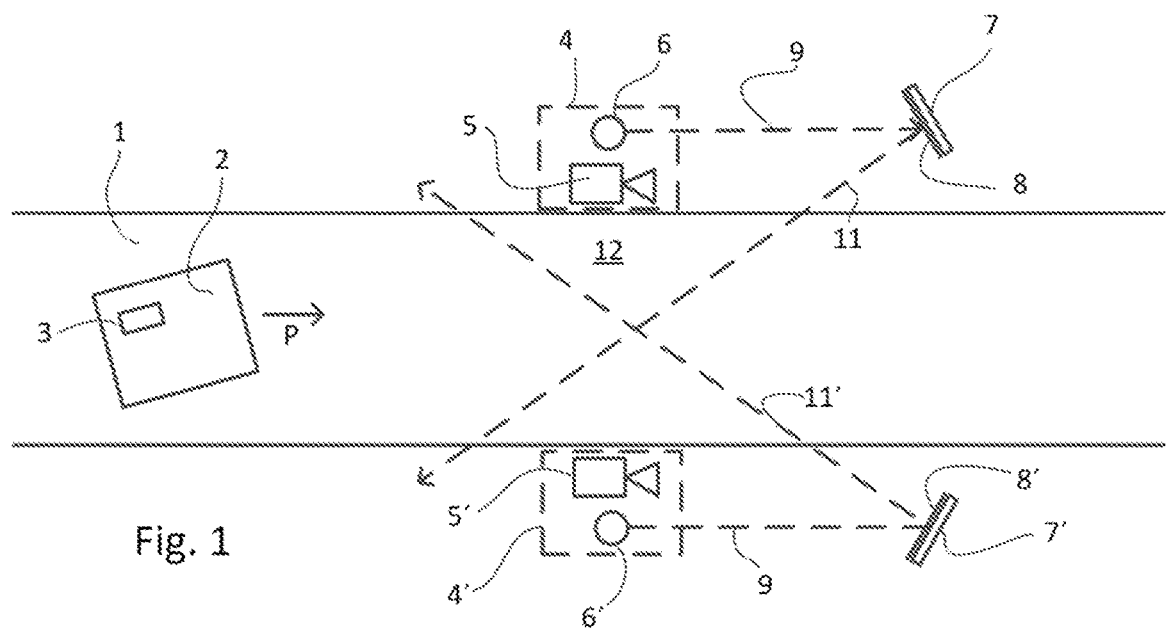
FIG. 1 shows one form of an imaging system for capturing an object in a state in which the object is not yet being captured according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows one form of an imaging system for capturing an object 2. In some variations of the present disclosure, the object 2 can be moved in a direction of an arrow P on a conveyor 1. The purpose of capturing the object 2 can be to read a code 3, for example a barcode, on the object 2. The code 3 can be on any side of the object 2 and there can be several codes 3 on different sides of the object 2. The object 2 is guided along the imaging system on the conveyor belt 1. Even though the description of the exemplary forms refers to a single object 2, the application of the imaging system is not limited to piece goods, but can also be used in transport, handling and storage processes of bulk goods.

The imaging system has a plurality of light sources 6, 6' to illuminate the object 2 and a plurality of optical sensors 5, 5', the plurality of light sources 6, 6' emitting a light radiation 9. Each of the optical sensors 5, 5' can be combined with one of the light sources 6, 6', respectively, to form a capturing unit 4, 4'. In at least one variation, a first light source 6 and a second light source 6' of the plurality of light sources 6, 6' emit the light radiation 9 with an identical or near-identical wave characteristic. The wave characteristic is a physical property of light waves and the light radiation 9 of the plurality of light sources 6, 6' can be identical with regard to at least one wave characteristic. In some variations, several or all of the physical properties of the light waves of the light radiation 9 of the plurality of light sources 6, 6' are identical. For example, in at least one variation the plurality of light sources 6, 6' is identical, which makes the imaging system simple in structure, since only one type of light source 6, 6' is required.

The imaging system comprises a first filter 8, which is adapted to influence (e.g., selectively transmit or reflect) a wave characteristic, the first filter 8 being arranged such that the light radiation 9 between the first light source 6 and the object 2 falls on the first filter 8 so that the light radiation 9 is turned into a first influenced light beam 11 after being influenced by the first filter 8. A second filter 8' is adapted to influence a wave characteristic as well, the second filter 8' being arranged such that the light radiation 9 between the second light source 6' and the object 2 falls on the second filter 8', so that the light radiation 9 is turned into a second influenced light beam 11' after being influenced by the second filter 8'. In some variations the first filter 8 influences the wave characteristic differently than the second filter 8', so that the first influenced light beam 11 differs in its wave characteristic from the second influenced light beam 11' and its wave characteristic. A beam path of the light radiation 9 of the first light source 6 crosses a beam path of the light radiation 9' of the second light source 6' after being influenced by the first filter 8 and the second filter 8' in a capturing zone 12. Since the light radiation 9 is influenced differently by the first filter 8 and the second filter 8' with regard to the wave characteristic, there is no superposition of the first influenced light radiation 11 and the second influenced light radiation 11' in the capturing zone 12.

In the form shown in FIG. 1, a plurality of mirrors 7, 7' is provided, wherein in the depicted version a first mirror 7 of the plurality of mirrors comprises the first filter 8 and a second mirror 7' of the plurality of mirrors comprises the second filter 8'. The light radiation 9 of the plurality of light sources 6, 6' is specularly reflected by the plurality of mirrors 7, 7' and thereby influenced by the first filter 8 on the one hand and by the second filter 8' on the other hand with regard to the wave characteristic. For example, the plurality of mirrors 7, 7' specularly reflect the light radiation 9 in the direction of the capturing zone 12.

Figure 2:
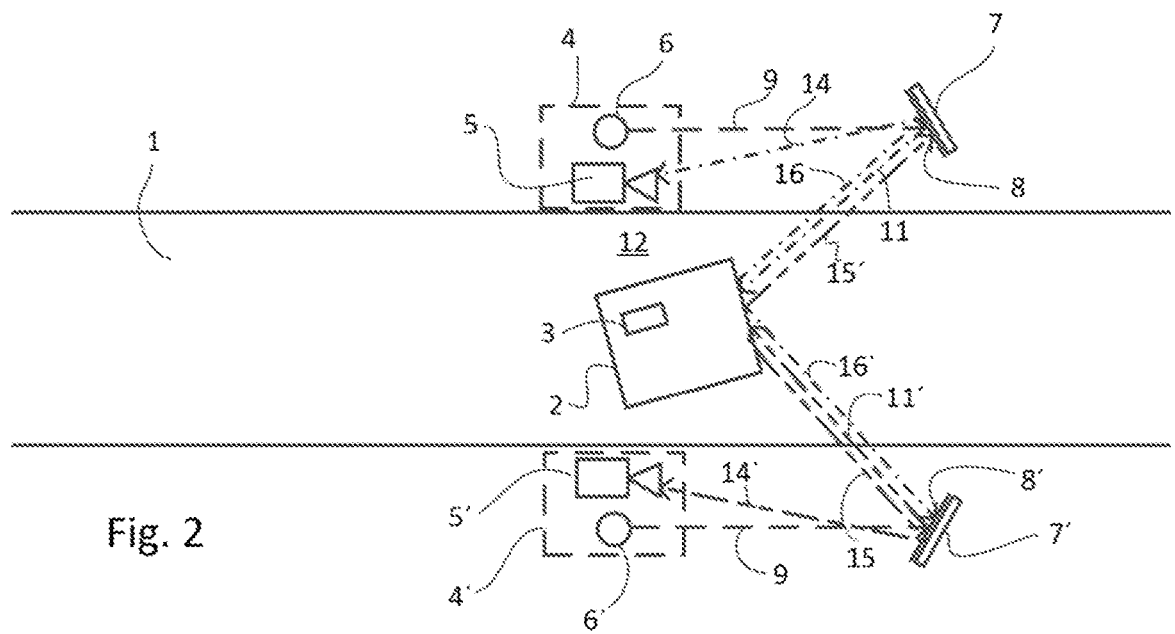
FIG. 2 shows the imaging system in FIG. 1 while the object is being captured.

With reference to FIG. 2, a capturing of the object 2 by the imaging system is described below, the form of the imaging system being the same to FIG. 1, which is not described again in full detail. Object 2 is transported by means of the conveyor 1 into the capturing zone 12. The light radiation 9 of the first light source 6 is specularly reflected by the first mirror 7 in the direction of the capturing zone 12 and is thereby influenced by the first filter 8 with regard to the wave characteristic, so that the light radiation 9 falls onto the object 2 as the first influenced light radiation 11. The light radiation 9 of the second light source 6' is specularly reflected by the second mirror 7' in the direction of the capturing zone 12 and is thereby influenced by the second filter 8' with regard to the wave characteristic, so that the light radiation 9 falls onto the object 2 as the second influenced light radiation 11'. On a surface of the object 2, the first influenced light radiation 11 and the second influenced light radiation 11' are remitted, also called diffusely reflected. The remitted light radiation is in the following generally referred to as a reflected light radiation. Of the total amount of the reflected light radiation, only those fractions with relevant beam paths are described below, i.e. fractions that cannot reach one of the optical sensors 5, 5' due to the diffuse reflection are not described further.

The first influenced light radiation 11 is reflected by the object 2, whereby a first reflected fraction 16 of the first influenced light radiation 11 reaches the first mirror 7 and a second reflected fraction 16' of the first influenced light radiation 11 reaches the second mirror 7'. Correspondingly, the second influenced light radiation 11' is reflected by the object 2, whereby a first reflected fraction 15' of the second influenced light radiation 11' reaches the first mirror 7 and a second reflected fraction 15 of the second influenced light radiation 11' reaches the second mirror 7'. Thus the reflected light radiation between the object 2 and the first sensor 5 of the plurality of sensors 5, 5' falls on the first filter 8, and between the object 2 and the second sensor 5' of the plurality of sensors 5, 5' falls on the second filter 8'.

More precisely, the first reflected fraction 16 of the first influenced light beam 11 and the first reflected fraction 15' of the second influenced light beam 11' fall on the first filter 8, which is adapted to influence the wave characteristic. The first reflected fraction 16 of the first influenced light beam 11 already comprises that wave characteristic influenced by the first filter 8, so that it passes the first filter 8 essentially unchanged. The first reflected fraction 15' of the second influenced light radiation 11', on the other hand, does not have the wave characteristic influenced by the first filter 8, so that the wave characteristic of the second influenced light radiation 11' is once again influenced by the first filter 8. In some variations of the present disclosure, depending on a type of the first filter 8 used, the first reflected fraction 15' of the second influenced light beam 11' is filtered out and does not reach the first sensor 5.

Accordingly, the second reflected fraction 16' of the first influenced light beam 11 and the second reflected fraction 15 of the second influenced light beam 11' fall on the second filter 8', which is adapted to influence the wave characteristic. The second reflected fraction 15 of the second influenced light radiation 11' already comprises that wave characteristic influenced by the second filter 8', so that it passes the second filter 8' essentially unchanged. The second reflected fraction 16' of the first influenced light radiation 11, on the other hand, does not have the wave characteristic influenced by the second filter 8', so that the wave characteristic of the first influenced light radiation 11 is again influenced by the second filter 8'. In at least one variation, depending on the type of the second filter 8' used, the second reflected fraction 16' of the first influenced light beam 11 is filtered out and does not reach the second sensor 5'.

The plurality of optical sensors 5, 5' are adapted to detect the light radiation reflected by the object 2. Of the total of reflected light radiation, a first detected fraction 14 reaches the first optical sensor 5 and a second detected fraction 14' reaches the second optical sensor 5'. The object 2 is captured by means of the first and second fractions 14, 14' of the reflected light radiation detected by the plurality of optical sensors 5, 5'. Due to the described arrangement of the first filter 8 and the second filter 8', the light radiation 9 falls on one of the filters 8, 8' on its way to the object 2. The reflected light radiation, more precisely the reflected first and second components 15, 15', 16, 16' of the first and second influenced light radiation 11, 11' fall on the same first or second filter 8, 8' again on the respective way back from the object 2 to the respective sensor of the plurality of sensors 5, 5'. This inhibits overexposure caused by superposition of the intersecting beam paths of the light radiation from the different light sources of the plurality of light sources 6, 6'. The plurality of sensors 5, 5' may be identical with regard to the wave properties of the reflected light radiation to be detected. In some variations, the imaging system does not need sensors 5, 5', which are adapted to detect only the reflected light radiation with a certain wave characteristic. According to at least one variation, all sensors of the plurality of sensors 5, 5' are identical, which makes the imaging system simple in structure, since only one type of sensor 5, 5' is needed.

Figures 3, 4:
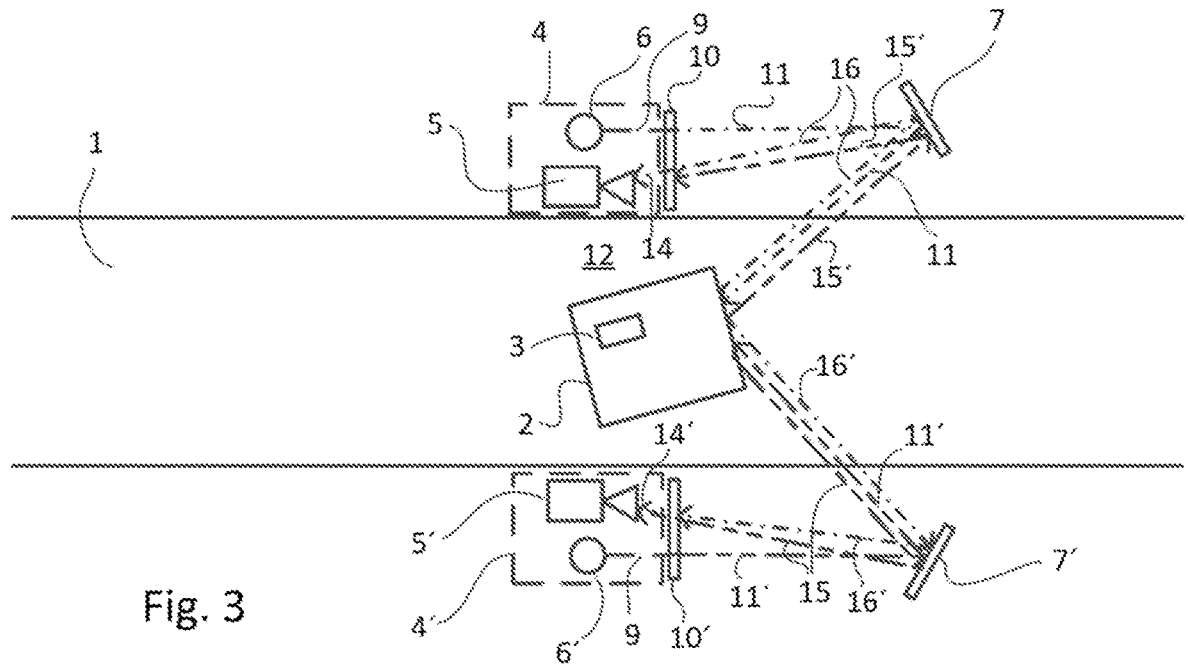
FIG. 3 shows another form of an imaging system while an object is being captured according to the teachings of the present disclosure.
FIG. 4 shows a further form of an imaging system according to the teachings of the present disclosure.

With reference to FIG. 3, another form of the imaging system is described, which is shown during the capturing of the object 2. The form differs in the type and arrangement of a plurality of filters 10, 10', which here are provided as filter discs.

The first filter 10 is adapted to influence the wave characteristic, whereby the first filter 10 is arranged such that the light radiation 9 between the first light source 6 and the object 2 falls on the first filter 10 and that the reflected light radiation between the object 2 and the first sensor 5 falls on the first filter 10. The second filter 10' is adapted to influence the wave characteristic, the second filter 10' being arranged such that the light radiation 9 between the second light source 6' and the object 2 falls on the second filter 10' and that the reflected light radiation between the object 2 and the second sensor 5' falls on the second filter 10'. The first filter 10 influences the wave characteristic differently than the second filter 10'. Due to the described arrangement of the plurality of filters 10, 10', the light radiation 9 falls on one of the filters of the plurality of filters 10, 10' on the way to the object 2. The reflected light radiation falls on the same filter 10, 10' again on the way from the object 2 to the respective sensor of the plurality of sensors 5, 5'. This inhibits overexposure caused by superposition of the intersecting light radiations from different light sources of the plurality of light sources 6, 6'. The plurality of sensors 5, 5' may not differ with regard to the wave properties of the reflected light radiation to be detected. In some variations, all the sensors of the plurality of sensors 5, 5' are identical, which allows the imaging system to have a simple structure, since only one type of sensor 5, 5' is needed.

With reference to FIG. 3, the capturing of the object 2 by the imaging system is described below, with identical components having the same reference signs as in FIGS. 1 and 2 and not being described again in full detail. The light radiation 9 of the first light source 6 is influenced by the first filter 10 with respect to the wave characteristic, so that the light radiation 9 becomes the first influenced light radiation 11, which falls on the object 2. The light radiation 9 of the second light source 6' is influenced by the second filter 10' with respect to the wave characteristic, so that the light radiation 9 becomes the second influenced light radiation 11', which falls on the object 2. The first influenced light radiation 11 and the second influenced light radiation 11' are reflected diffusely from object 2. The first reflected fraction 16 of the first influenced light beam 11 and the first reflected fraction 15' of the second influenced light beam 11' fall on the first filter 10, which is adapted to influence the wave characteristic. The first reflected fraction 16 of the first influenced light beam 11 already comprises that wave characteristic influenced by the first filter 10, so that it passes the first filter 10 essentially unchanged. The first reflected fraction 15' of the second influenced light radiation 11', on the other hand, does not have the wave characteristic influenced by the first filter 10, so that the wave characteristic of the second influenced light radiation 11' is once again influenced by the first filter 10. In some variations, depending on a type of the first filter 10 used, the first reflected fraction 15' of the second influenced light beam 11' is filtered out and does not reach the first sensor 5. The second reflected fraction 16' of the first influenced light beam 11 and the second reflected fraction 15 of the second influenced light beam 11' fall on the second filter 10', which is adapted to influence the wave characteristic. The second reflected fraction 15 of the second influenced light radiation 11' already comprises that wave characteristic influenced by the second filter 10', so that it passes the second filter 10' essentially unchanged. The second reflected fraction 16' of the first influenced light radiation 11, on the other hand, does not have the wave characteristic influenced by the second filter 10', so that the wave characteristic of the second filter 10' is again influenced by the second filter 8'. In some variations, depending on the type of the second filter 10' used, the second reflected fraction 16' of the first influenced light beam 11 is filtered out and does not reach the second sensor 5'.

Optionally, as shown, the light radiation 9 can also be specularly reflected via the first mirror 7 and via the second mirror 7' in the direction of the capturing zone 12, even if the function of the filters 10, 10' here is independent of the plurality of mirrors 7, 7'. The specular reflection of the light radiation 9 and also of the reflected light radiation, more precisely of the reflected first and second portions 15, 15', 16, 16' of the first and second influenced light radiations 11, 11', allows, for example, the sensitive and expensive components of the imaging system, such as the plurality of light sources 6, 6' and the plurality of sensors 5, 5', to be arranged in an area where these components are protected from being damaged by operating personnel or the object 2, and from contamination. According to an aspect of the exemplary form, the filters 10, 10' provided as filter discs are arranged directly at the capturing units 4, 4'. The capturing units 4, 4' are to be understood as a set, each comprising one of the light sources 6, 6' and one of the sensors 5, 5', respectively. Where appropriate, each of the light sources 6, 6' is assigned to exactly one of the sensors 5, 5'. For example, the capturing units 4, 4' each have a common housing for one of the light sources 6, 6' and one of the sensors 5, 5'. The capturing units 4, 4', for example, are arranged above and below the conveyor 1, alternatively or additionally also to the side of it.

With reference to FIG. 4, another form of the detection system is described, which differs from the form shown in FIG. 1 with regard to the count of light sources and sensors. The additional features are discussed below, whereas the features known from FIG. 1 are not described in full detail again. The detection system is not limited to an arrangement of two light sources 6, 6' with two sensors 5, 5'. Instead, more light sources and sensors are conceivable, the light beams 9 of which intersect each other, for example three, four, five or more, depending on the demands for capturing and the available installation space. In the following, the form with three light sources 6, 6', 6" and three sensors 5, 5', 5" is described as an example. The imaging system has an additional third light source 6" of the plurality of light sources, which emits the light radiation 9 with the identical wave characteristic as the first light source 6 and the second light source 6'. The third light source 6" is located, for example, above the conveyor 1. A light beam of the light radiation 9 of the third light source 6" intersects at least one of the light beams of the light radiation 9 of the first light source 6 and the second light source 6". A third filter 8" is adapted to influence the wave characteristic, the third filter 8" being arranged in such a way that the light radiation 9 falls on the third filter 8" between the third light source 6" and the capturing zone 12. The reflected light radiation is not shown here, as no object is located in the capturing zone 12, but comprehensibly it will also fall on the third filter 8" again on the way to the third sensor 5" during capturing of an object. The third filter 8" influences the wave characteristic differently than the first filter 8 and the second filter 8'. In the exemplary form shown, the plurality of mirrors 7, 7', 7" is provided, whereby here, for example, the first mirror 7 comprises the first filter 8, the second mirror 7' comprises the second filter 8' and a third mirror 7" comprises the third filter 8". The light radiation 9 of the plurality of light sources 6, 6', 6" is specularly reflected by the plurality of mirrors 7, 7', 7" and is thereby influenced by the respective one of the first filter 8, the second filter 8', and the third filter 8" with respect to the wave characteristic. For example, the plurality of mirrors 7, 7', 7" specularly reflect the light radiation 9 in the direction of the capturing zone 12. The beam paths during capturing are not discussed in detail here, as these can be derived from the forms described above.

The imaging system is explained in more detail below with reference to the forms described above, with regard to the aspect of the wave characteristic of light radiation.

According to one aspect, the identical wave characteristic of light radiation 9 concerns an identical light source band range of light wavelengths. The plurality of light sources 6, 6', 6" emit the light radiation 9 with this identical light source band range of light wavelengths. The light source band range comprises one or more of the spectra of ultra-violet radiation, visible light and infrared radiation. For example, light sources 6, 6', 6" each emit white light. The plurality of sensors 5, 5', 5", for example, are adapted to detect the reflected light radiation over the entire light source band range of light wavelengths. The first filter 8 affects the wave characteristic such that the light source band range is limited to a first subband range of light wavelengths, the second filter 8' affects the wave characteristic such that the light source band range is limited to a second subband range of light wavelengths, the first subband range of light wavelengths being different from the second subband range of light wavelengths. Where appropriate, the total light source band range of light wavelengths may be divided into the first subband range and the second subband range. In the form shown in FIG. 4, the third filter 8" influences the wave characteristic in such a way that the light source band range is limited to a third subband range of light wavelengths, the third subband range of light wavelengths being different from the first subband range of light wavelengths and from the second subband range of light wavelengths. For example, the light source band range of light wavelengths is divided into the first subband range, the second subband range and the third subband range. A count of subband ranges corresponds, for example, to a count of light sources 6, 6', 6", the light paths of which intersect each other. The subband ranges can be selected in such a way that they do not overlap each other, for example, in order to avoid overexposure due to superposition of light radiation. The subband ranges cover the entire light source band range of the light radiation, thus enabling, for example, wide subband ranges which are not limited to a single color of visible light, but extend over several colors of visible light. This can be used, for example, to detect colored codes on the object 2, which absorb a fraction of the light spectrum. A subband range limited to the absorbed light spectrum would render the capturing difficult or impossible, e.g. if a red code is captured with red light.

Cameras can be provided as sensors 5, 5', 5", for example line scan cameras. Matrix cameras can be used as well. Mirrors 7, 7', 7" with filters 8, 8', 8" are provided, for example, with optical filters in the form of a coating, possibly in the form of a film bonded to the mirrors 7, 7', 7" or as a vapor deposited coating. Alternatively, one or more filters 10, 10' may be provided as filter discs in place of one or more of the filters 8, 8', 8" as coating for the first filter 8, 10, the second filter 8', 10' and, if applicable, the third filter 8', as in the form shown in FIG. 4. For example, spectral filters are used as first, second and third filters 8, 8', 8", 10, 10', whereby the bandwidths of the light wavelengths of the spectral filters are realized as comb filters shifted with respect to each other. As a result, the first subband range of light wavelengths is shifted with respect to the second subband range of light wavelengths and possibly with respect to the third subband range of light wavelengths. Alternatively, it is possible to use an optical high pass filter and/or an optical low pass filter. For example, the first filter 8, 10 as a high pass filter allows only visible light wavelengths from yellow to dark red to pass and the second filter 8', 10' as a low pass filter allows only visible light wavelengths from blue to green to pass.

A further aspect can be realized in each of the previously described forms and is described below with reference to the forms according to FIGS. 1 and 2 together. According to the aspect, the wave characteristic refers to an orientation or direction of the wave transverse oscillation. The identical wave characteristic of the light radiation 9 may thus be an irregularly oriented transverse oscillation, whereby the plurality of light sources 6, 6' emit the light radiation 9 with the irregularly oriented transverse oscillation, i.e. without polarization, or irregularly polarized. The plurality of sensors 5, 5' is adapted to detect the reflected light radiation with the transverse oscillation in any direction. The first filter 8, 10 influences the wave characteristic such that the transverse oscillation is restricted to a first oscillation direction, the second filter 8', 10' influences the wave characteristic such that the transverse oscillation is restricted to a second oscillation direction, wherein the first oscillation direction of the transverse oscillation is different from the second oscillation direction of the transverse oscillation. Even if the reflected light radiation partially loses the influenced wave characteristic, i.e. the first direction of oscillation or the second direction of oscillation, due to the diffuse reflection at the object 2, the overexposure is nevertheless reduced. For example, the first filter 8, 10 and the second filter 8', 10' are provided as polarizers, wherein the light radiation 9 and the reflected light radiation are influenced in the wave characteristic in such a way that the first oscillation direction of the transverse oscillation is rotated by 90 degrees with respect to the second oscillation direction of the transverse oscillation.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a nonexclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An imaging system for capturing an object, the imaging system comprising
    a plurality of light sources for illuminating the object, wherein the plurality of light sources comprise a first light source and a second light source configured to emit light radiation, wherein the light radiations emitted from the first and second light sources have a common wave characteristic;
    a plurality of optical sensors configured to detect light radiation reflected from the object;
    a first filter configured to influence the common wave characteristic of the light radiation emitted from the first light source, wherein the first filter is arranged such that the light radiation between the first light source and the object falls on the first filter and the reflected light radiation between the object and a first optical sensor of the plurality of optical sensors falls on the first filter; and
    a second filter configured to influence the common wave characteristic of the light radiation from the second light source, wherein the second filter is arranged such that the light radiation between the second light source and the object falls on the second filter and the reflected light radiation between the object and a second optical sensor of the plurality of optical sensors falls on the second filter,
    wherein the first filter influences the common wave characteristic of the light radiation emitted from the first light source differently than the second filter influences the common wave characteristic of the light radiation from the second light source.

2. The imaging system according to claim 1, wherein:
    the plurality of light sources further comprises a third light source configured to emit light radiation, wherein the light radiations from the first, second and third light sources have a common wave characteristic;
    the imaging system comprises a third filter configured to influence the common wave characteristic of the light radiation emitted from the third light source;
    the third filter is arranged such that the light radiation between the third light source and the object falls on the third filter and the reflected light radiation between the object and a third optical sensor of the plurality of sensors falls on the third filter; and
    the third filter influences the common wave characteristic of the light radiation emitted from the third light source differently than the first filter influences the common wave characteristic of the light radiation emitted from the first light source and the second filter influences the common wave characteristic of the light radiation from the second light source.

3. The imaging system according to claim 2, wherein a light path of the light radiation emitted from the first light source intersects a light path of the light radiation emitted from the second light source.

4. The imaging system according to claim 3, wherein a light path of the light radiation emitted from the third light source intersects at least one of the light path of the light radiation emitted from the first light source and the light path of the light radiation emitted from the second light source.

5. The imaging system according to claim 1, wherein:
    the common wave characteristic of the light radiation emitted from the first light source and the light radiation emitted from the second light source is an identical light source band range of light wavelengths;
    the plurality of light sources emit light radiation with the identical light source band range of light wavelengths;
    the plurality of optical sensors are adapted to detect reflected light radiation over the identical light source band range of light wavelengths;
    the first filter influences the common wave characteristic of the light radiation emitted from the first light source such that the identical light source band range is limited to a first subband range of the light wavelengths;
    the second filter influences the common wave characteristic of the light radiation emitted from the second light source such that the identical light source band range is limited to a second subband range of the light wavelengths; and
    the first subband range of the light wavelengths is different from the second subband range of the light wavelengths.

6. The imaging system according to claim 5, wherein the identical light source band range of light wavelengths is divided into the first subband range and the second subband range.

7. The imaging system according to claim 5, wherein:
    the imaging system comprises a third light source configured to emit light radiation with the common wave characteristic and the identical light source band range of light wavelengths as the light radiation emitted from the first light source and the light radiation emitted from the second light source, and a third filter configured to influence the common wave characteristic of the light radiation emitted from the third light source such that the identical light source band range is limited to a third subband range of light wavelengths;

the third subband range of light wavelengths is different from the first subband range of light wavelengths and from the second subband range of light wavelengths; and the light source band range of light wavelengths is divided into the first subband range of light wavelengths, the second subband range of light wavelengths and the third subband range of light wavelengths.

8. The imaging system according to claim 5, wherein a count of subband ranges corresponds to a count of light sources with intersecting light paths.

9. The imaging system according to claim 8, wherein the subband ranges do not overlap each other.

10. The imaging system according to claim 8, wherein the subband ranges cover the identical light source band range of light wavelengths of the light radiation.

11. An imaging system according to claim 5, wherein the first filter and the second filter are provided as spectral filters.

12. An imaging system according to claim 5, wherein the first filter and the second filter are provided as comb filters, and the first subband range of light wavelengths of the first filter is shifted with respect to the second subband range of light wavelengths of the second filter.

13. An imaging system according to claim 5, wherein the first filter is provided an optical highpass filter and the second filter is provided as an optical lowpass filter.

14. The imaging system according to claim 1 further comprising a plurality of mirrors.

15. The imaging system according to claim 14, wherein a first mirror of the plurality of mirrors comprises the first filter and a second mirror of the plurality of mirrors comprises the second filter.

16. The imaging system according to claim 14, wherein a third mirror of the plurality of mirrors comprises the third filter.

17. An imaging system according to claim 1, wherein the first filter and the second filter are each provided as a filter disk.

18. An imaging system according to claim 17, wherein a third filter is provided as a filter disk.

19. An imaging system according to claim 1, wherein:
the common wave characteristic is an irregularly oriented transverse oscillation;
the first light source and the second light source emit the light radiation with the irregularly oriented transverse oscillation;
the first sensor and the second sensor are adapted to detect the reflected light radiation with an arbitrarily oriented transverse oscillation;
the first filter influences the common wave characteristic such that the transverse oscillation is restricted to a first oscillation direction;
the second filter influences the common wave characteristic such that the transverse oscillation is restricted to a second oscillation direction; and
the first oscillation direction of the transverse oscillation is different from the second oscillation direction of the transverse oscillation.

20. An imaging system according to claim 19, wherein the first filter and the second filter are provided as polarizers.

* * * * *